US010389205B2

(12) United States Patent
Geiler et al.

(10) Patent No.: US 10,389,205 B2
(45) Date of Patent: *Aug. 20, 2019

(54) MOTOR PROGRAMMING TOOL

(71) Applicant: Nidec Motor Corporation, St. Louis, MO (US)

(72) Inventors: Charles L. Geiler, Caseyville, IL (US); Chetan O. Modi, Valley Park, MO (US); Douglas D. Glenn, Litchfield, IL (US); Robert J. Ploof, Jr., Collinsville, IL (US); Anandan C. Velayutham, St. Louis, MO (US); James L. Skinner, Collinsville, IL (US)

(73) Assignee: Nidec Motor Corporation, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/116,728

(22) Filed: Aug. 29, 2018

(65) Prior Publication Data

US 2019/0173353 A1   Jun. 6, 2019

Related U.S. Application Data

(63) Continuation of application No. 15/404,035, filed on Jan. 11, 2017, now Pat. No. 10,075,042.

(Continued)

(51) Int. Cl.
*H01R 13/62* (2006.01)
*H02K 5/22* (2006.01)
(Continued)

(52) U.S. Cl.
CPC ......... *H02K 5/225* (2013.01); *H01R 13/2492* (2013.01); *H01R 13/6658* (2013.01); *H01R 13/7172* (2013.01); *H02K 11/30* (2016.01)

(58) Field of Classification Search
CPC .. H01R 2107/00; H01R 24/68; H01R 13/717; H01R 13/6272; H01R 13/44; H02K 5/225; H02K 11/26; G06K 7/1413
(Continued)

(56) References Cited

U.S. PATENT DOCUMENTS 3,602,009 A * 8/1971 Powell ...................... F16C 1/08
464/52
6,243,654 B1 * 6/2001 Johnson ............... H01R 13/665
439/620.09

(Continued)

*Primary Examiner* — Abdullah A Riyami
*Assistant Examiner* — Nelson R. Burgos-Guntin
(74) *Attorney, Agent, or Firm* — Hovey Williams LLP

(57) ABSTRACT

A tool for programming a controller of an electric motor by engaging a connection block of the motor and providing high voltage power and communicating programming signals to the controller. The tool includes a body having an interface for engaging the connection block, and internal wiring presenting tool terminals at the interface for making contact with corresponding motor terminals to allow for providing power and communicating signals between the tool and the controller. An energy-limited transformer having an isolated high impedance secondary winding provides both electrical isolation to protect against shock and low energy output to protect against arc flash. Redundant interlocks include a software interlock which allows the power to be present at the interface only during actual programming of the controller. A light ring encircling the body indicates the presence of high voltage and is visible from multiple directions.

20 Claims, 7 Drawing Sheets

Related U.S. Application Data

(60) Provisional application No. 62/277,218, filed on Jan. 11, 2016.

(51) Int. Cl.
  *H01R 13/717* (2006.01)
  *H01R 13/66* (2006.01)
  *H01R 13/24* (2006.01)
  *H02K 11/30* (2016.01)

(58) Field of Classification Search
  USPC ........... 439/188, 620.21, 620.22, 924.1, 490; 362/95
  See application file for complete search history.

(56) References Cited

U.S. PATENT DOCUMENTS

| | | | | |
|---|---|---|---|---|
| 8,328,562 | B1* | 12/2012 | Rassoolkhani | H01R 11/18 320/104 |
| 8,632,353 | B2* | 1/2014 | Rassoolkhani | H01R 13/639 439/347 |
| 8,837,104 | B2* | 9/2014 | Geiler | H01R 13/2421 361/195 |
| 2006/0068654 | A1* | 3/2006 | Guillot | H01H 43/065 439/894 |
| 2008/0293277 | A1* | 11/2008 | Kumar | H01R 13/53 439/247 |
| 2009/0275230 | A1* | 11/2009 | Priyadarshi | G02B 6/4201 439/370 |
| 2011/0124220 | A1* | 5/2011 | Su | H01R 13/7175 439/449 |
| 2012/0104878 | A1* | 5/2012 | Heilman | H02K 5/10 310/43 |
| 2012/0164875 | A1* | 6/2012 | Su | H01R 13/6658 439/490 |
| 2013/0095685 | A1* | 4/2013 | Rassoolkhani | H01R 13/62 439/345 |
| 2014/0051304 | A1* | 2/2014 | Hoegerle | A61B 17/1622 439/660 |
| 2014/0139166 | A1* | 5/2014 | Durfee | G06F 8/60 318/494 |
| 2014/0162502 | A1* | 6/2014 | Geiler | H01R 13/2421 439/700 |
| 2015/0296050 | A1* | 10/2015 | Bomkamp | H04L 67/12 709/217 |
| 2016/0365818 | A1* | 12/2016 | Shahi | H02P 27/06 |
| 2017/0201161 | A1* | 7/2017 | Geiler | H02K 5/225 |

* cited by examiner

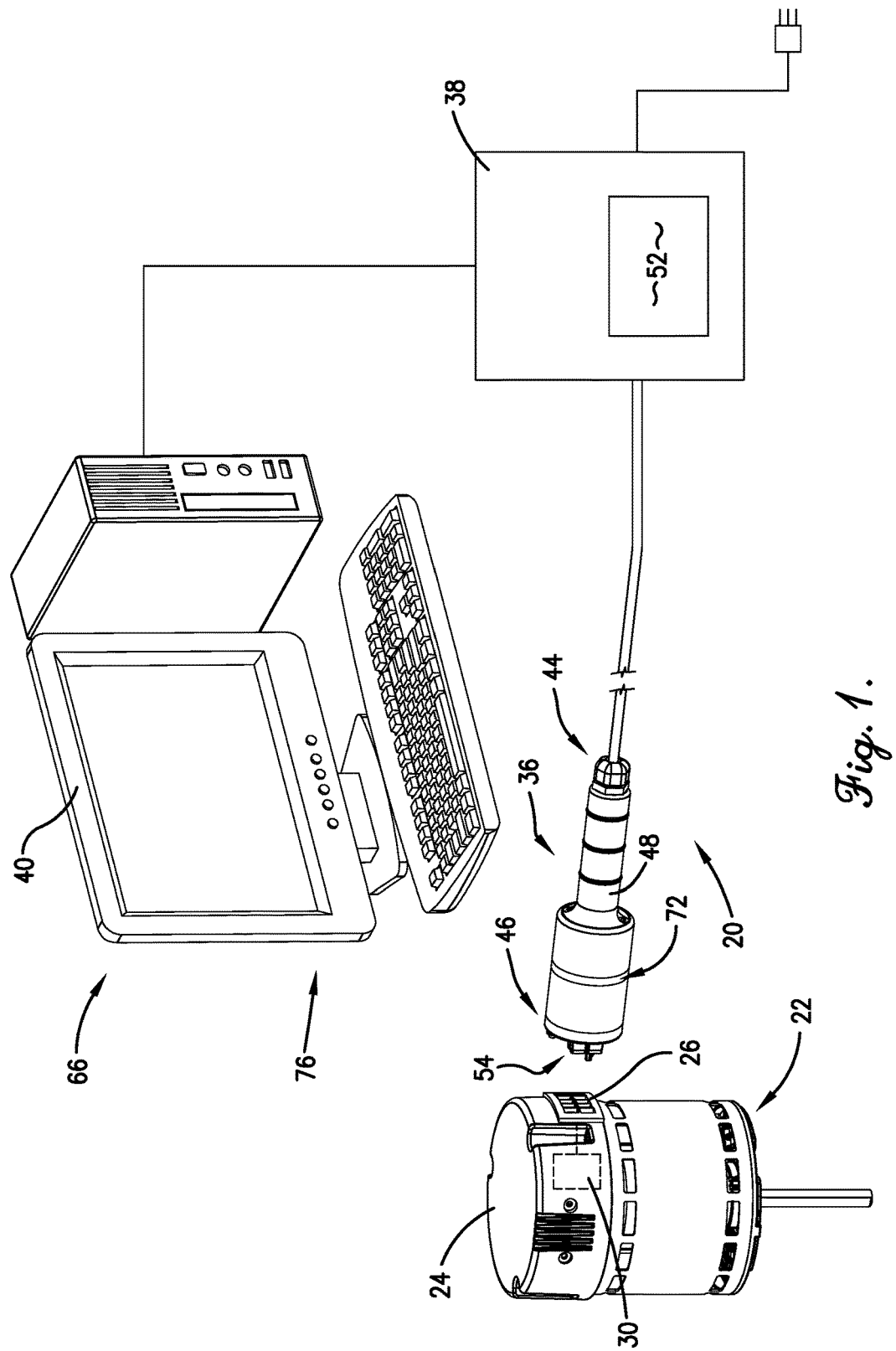

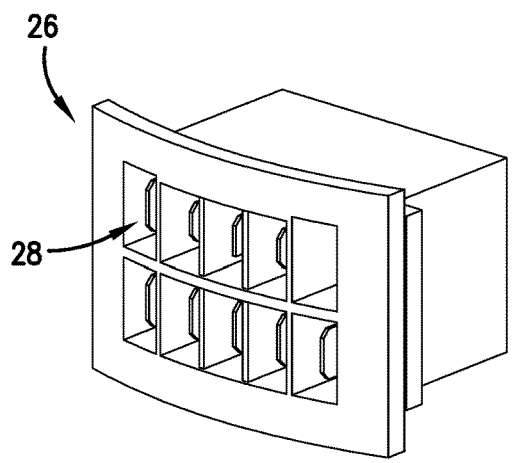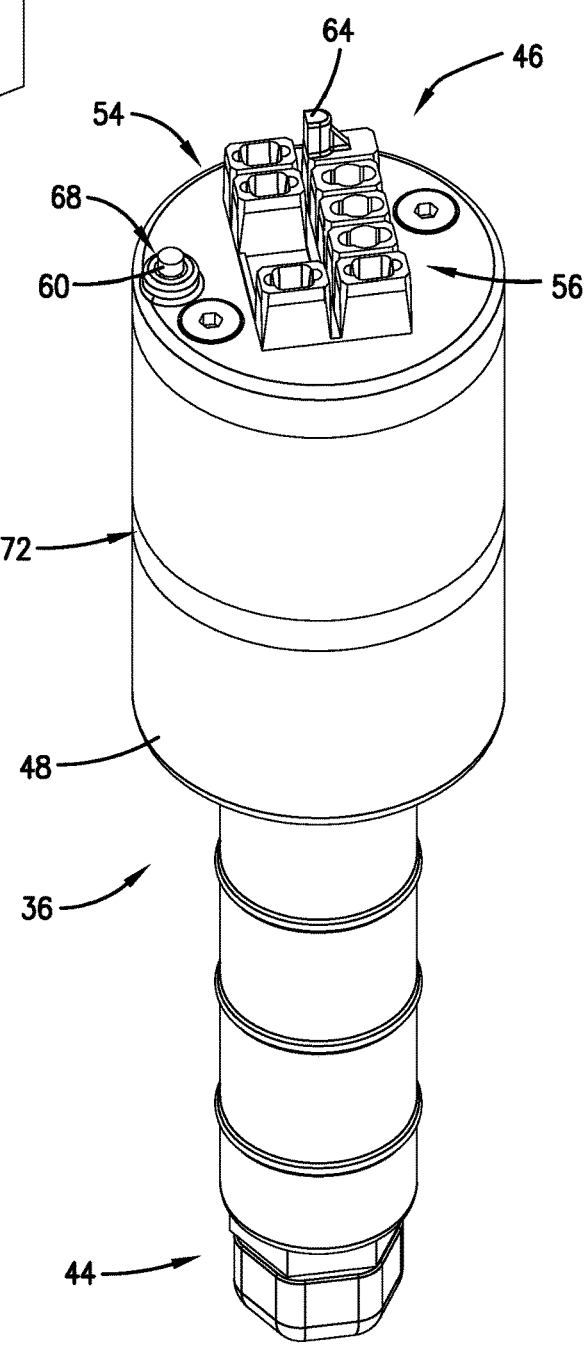

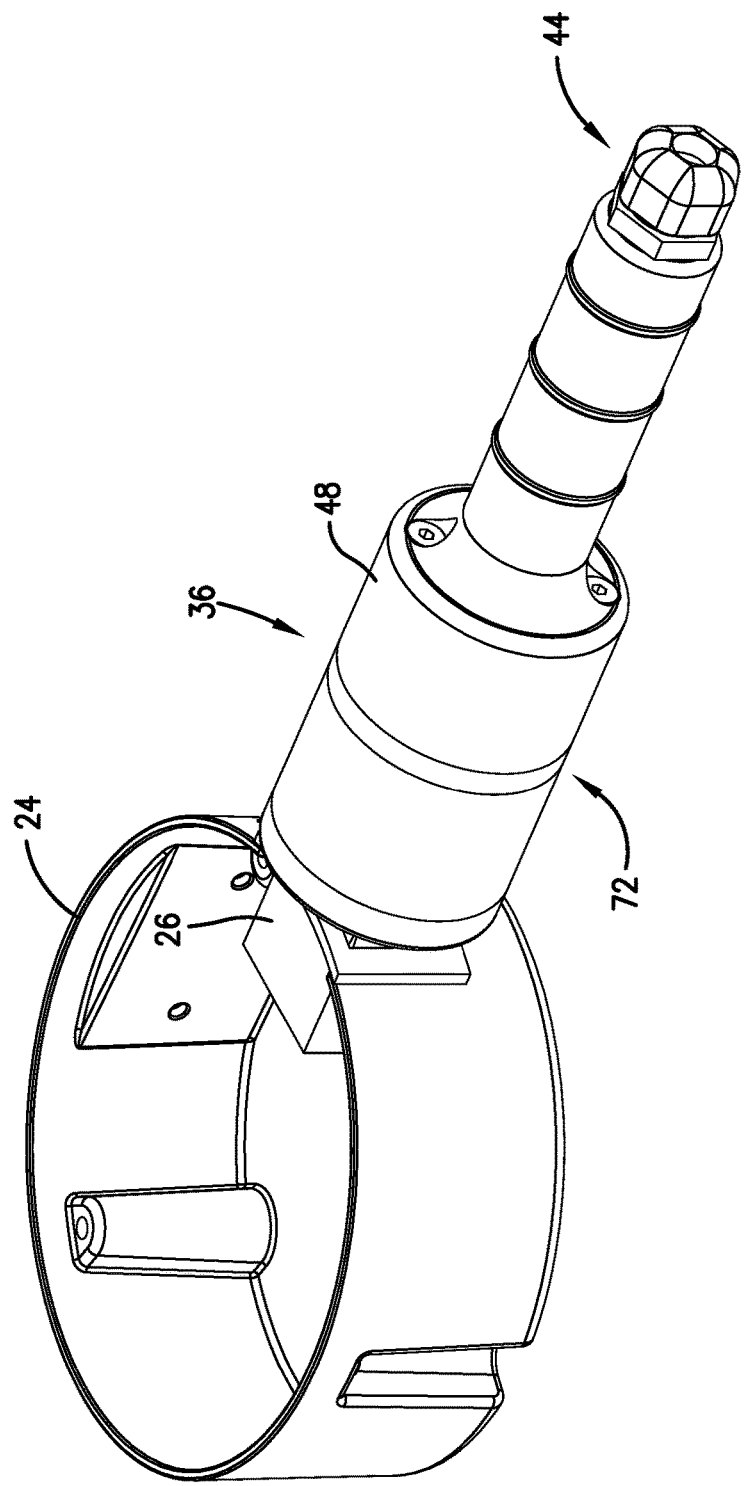

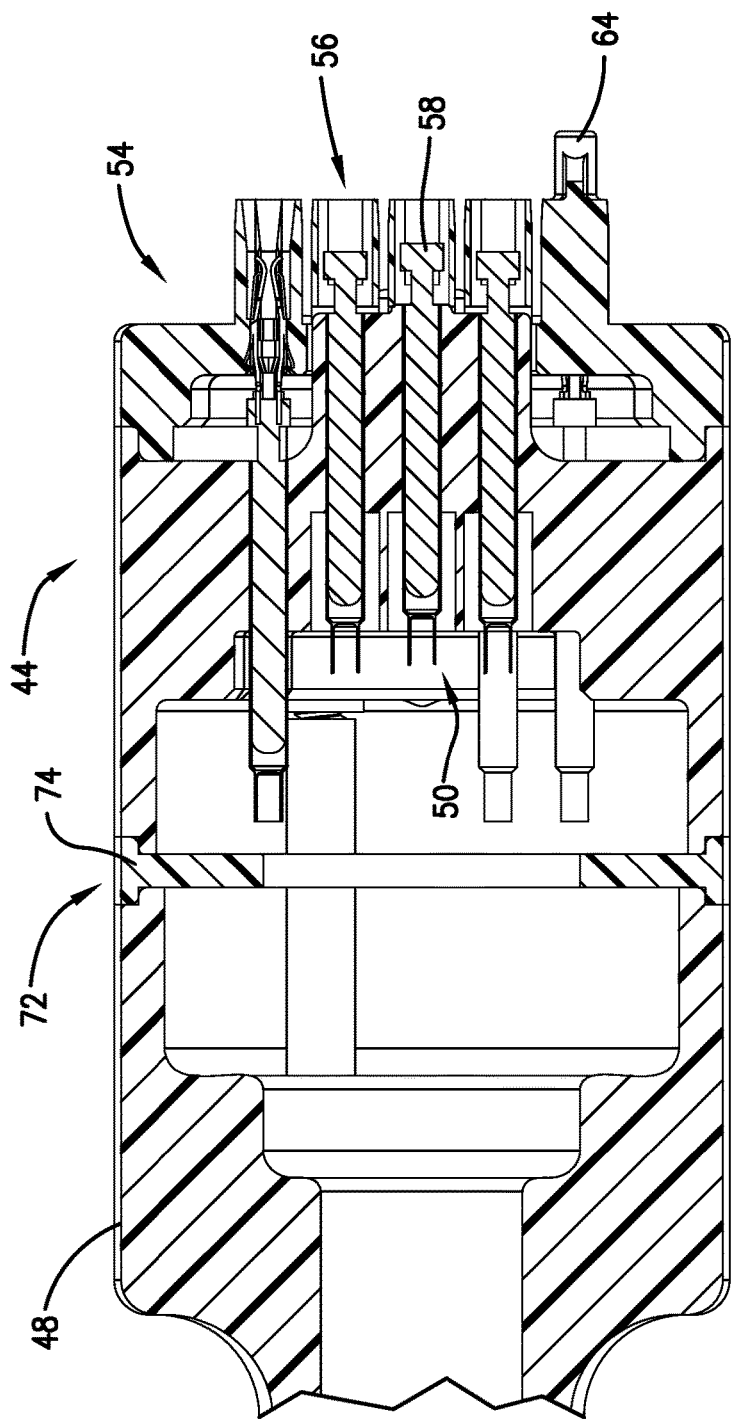

MOTOR PROGRAMMING TOOL

RELATED APPLICATION

The present U.S. non-provisional patent application is a continuation of and claims priority benefit of a co-pending earlier-filed U.S. non-provisional application titled "Motor Programming Tool," Ser. No. 15/404,035, filed Jan. 11, 2017, and of an earlier-filed U.S. provisional patent application titled "High Voltage Motor Programming Tool," Ser. No. 62/277,218, filed Jan. 11, 2016. The entire contents of the identified earlier-filed applications are hereby incorporated by reference into the present application as if fully set forth herein.

FIELD

The present invention relates generally to tools for programming electric motors. More specifically, the present invention concerns a motor programming tool for temporarily associating with an electrical connection block of a motor to provide high voltage power and communicate programming signals to a programmable controller of the motor.

BACKGROUND

Electric motors commonly include electronic controllers that govern their operation. Some of these electronic controllers are programmable, which allows the motors to be programmed to operate at particular levels, especially when the motors are used to drive particular machines (e.g., blowers or compressors). In this way, motors which otherwise may be physically similar or identical can each operate differently based on the settings of the programmable controller. For example, many machines driven by motors function optimally when the motors operate at certain levels, so it is often desirable to program the motor controllers, either during initial assembly or once coupled with the machines, to operate at those levels.

Motors commonly include electrical connection blocks that are configured to receive power and operational control signals. Such a connection block often includes a molded connector with a plurality of motor terminals connected via conductors to the programmable controller. Programming tools for programming motor controllers are commonly configured to plug into the motor terminals of the connection block. More specifically, the programming tools include a plurality of tool terminals that correspond to and are configured to physically engage the motor terminals. The programming tools are then unplugged once the motor controllers are programmed.

While prior art programming tools have been satisfactory in many respects, they are generally configured for lower voltage (50 V or less) applications which pose less risk of harm to their users from electrical shock and/or damage to components due to arc flash than higher voltage applications. For example, some such tools include lights to indicate when power is present, but these lights are typically directionally oriented and therefore may not be visible to users at all times. Further, prior art programming tools employ gendered terminals to frictionally engage the tools with the connection blocks during the programming process, which can cause high insertion or engagement forces that can damage the terminals.

This background discussion is intended to provide information related to the present invention which is not necessarily prior art.

SUMMARY

Embodiments of the present invention solve the above-described and other problems and limitations by providing a motor programming tool for programming a programmable controller component of an electric motor by temporarily associating with an electrical connection block of the motor to provide high voltage power and communicate programming signals to the programmable controller.

A first embodiment of a tool for programming a programmable controller of an electric motor by temporarily associating with a connection block of the electric motor and providing high voltage power and communicating programming signals to the programmable controller may broadly comprise a tool body, wiring, and an energy limited transformer. The tool body may include an interface portion configured to selectively engage the connection block of the electric motor. The wiring may be configured to carry the high voltage power and the programming signals, and may present a plurality of tool terminals at the interface portion for selective electrical contact with a plurality of motor terminals at the connection block to facilitate providing the high voltage power and communicating the programming signals to the programmable controller. The energy-limited transformer may have an electrically isolated high impedance secondary winding and may be otherwise configured both to provide an electrical isolation to protect against an electrical shock to a user of the tool and to provide a low energy output to protect against an arc flash damage to the electric motor.

A second embodiment of a tool for programming a programmable controller of an electric motor by temporarily associating with a connection block of the electric motor and providing high voltage power and communicating programming signals to the programmable controller may broadly comprise a tool body, wiring, a mechanical connection, and an interlock. The tool body may include an interface portion configured to selectively engage the connection block of the electric motor. The wiring may be configured to carry the programming signals, and may present a plurality of tool terminals at the interface portion for selective electrical contact with a plurality of motor terminals at the connection block to facilitate communication of the programming signals between the tool and the programmable controller. The mechanical connection may be configured to selectively maintain the interface portion engaged with the connection block, wherein the mechanical connection may be normally biased toward a closed position in which the mechanical connection is physically engaged with a complimentary structure on the electrical connection block. The interlock may be configured to allow provision of the high voltage power only when the interface portion is fully engaged with the connection block.

A third embodiment of a tool for programming a programmable controller of an electric motor by temporarily associating with a connection block of the electric motor and providing high voltage power and communicating programming signals to the programmable controller may broadly comprise a tool body, wiring, and a microprocessor executing a software component. The tool body may include an interface portion configured to selectively engage the connection block of the electric motor. The wiring may be configured to carry the high voltage power, and may present a plurality of tool terminals at the interface portion for selective electrical contact with a plurality of motor terminals at the connection block to facilitate communication of the programming signals between the tool and the programmable controller. The software component may be configured to determine a type of the electric motor to which the tool is engaged, and configured to accommodate a particular voltage requirement of the determined type of the electric motor.

Various implementations of any of the foregoing embodiments may include any one or more of the following additional features. The plurality of tool terminals at the interface portion may include a first electrical ground tool terminal which may be longer than the other tool terminals so as to be the first electrical contact established when the interface portion is selectively engaged with the connection block, and the last electrical contact broken when the interface portion is selectively disengaged from the connection block, and a second electrical ground tool terminal which may make electrical contact with a housing of the motor when the interface portion is selectively engaged with the connection block, wherein the first and second electrical ground tool terminals may be electrically connected within the tool body. One or more of the tool terminals may be disposed within a plurality of electrically non-conductive recesses configured to maintain both a sufficient creepage distance and a sufficient clearance distance between an adjacent pair of the plurality of tool terminals. One or more of the tool terminals may be a spring-loaded tool terminal configured to engage a corresponding one or more of the plurality of motor terminals and maintain engagement by a restorative force. One or more of the tool terminals may be a gendered tool terminal configured to engage a correspondingly gendered one or more of the plurality of motor terminals and maintain engagement by a friction force, and the number of gendered tool terminals may be determined by a minimum total amount of the individual friction forces required to maintain the interface portion engaged with the connection block.

The tool may further include a visual indicator mechanism configured to visually indicate a presence of the high voltage power at the interface portion, the visual indicator including one or more light sources configured to emit light when the high voltage power is present. The visual indicator mechanism may include a light ring disposed around the tool body and configured to disperse the light emitted by the one or more light sources around the tool body so as to be visible by a user of the tool from multiple directions, and the one or more light sources may be first and second light emitting diodes spaced approximately 180 degrees apart around the tool body, and the light ring fully encircles the tool body.

Implementations of the second and third embodiments may further include an energy-limited transformer having an electrically isolated high impedance secondary winding and otherwise configured both to provide an electrical isolation to protect against an electrical shock to a user of the tool and to provide a low energy output to protect against an arc flash damage to the electric motor.

Implementations of the first and third embodiments may further include an interlock configured to allow provision of the high voltage power only when the interface portion is fully engaged with the connection block. In any of the embodiments, the interlock may be a microswitch configured to be closed and allow provision of the high voltage power only when the interface portion of the tool body is engaged with the connection block of the electric motor. The interlock may be a software interlock configured to allow provision of the high voltage power only during programming of the programmable controller by automatically allowing the high voltage power to be provided at the beginning of a programming process and automatically disallowing the high voltage power from being provided at the end of the programming process. The interlock may be an electrical interlock configured to allow provision of the high voltage power only when one or more of the plurality of tool terminals is in electrical contact with one or more of the plurality of motor terminals.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein:

FIG. 1 is a high-level block diagram of an embodiment of the motor programming tool of the present invention, as well as an exemplary programmable electric motor;

FIG. 2 is an isometric view of an electrical connection block component of the exemplary electric motor of FIG. 1;

FIG. 3 is an isometric view of an embodiment of a handset component of the motor programming tool of FIG. 1;

Figure 6:
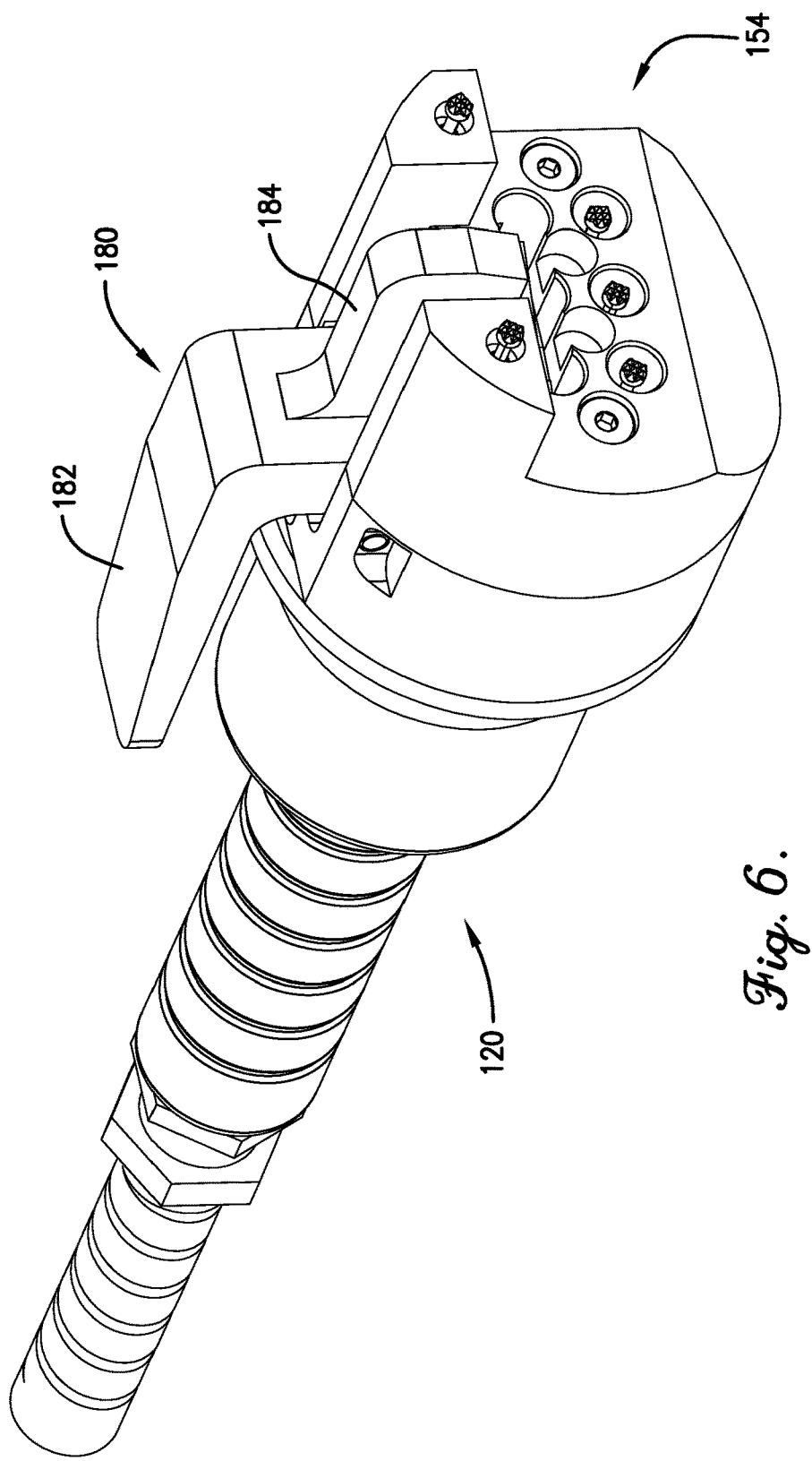
Figure 7:
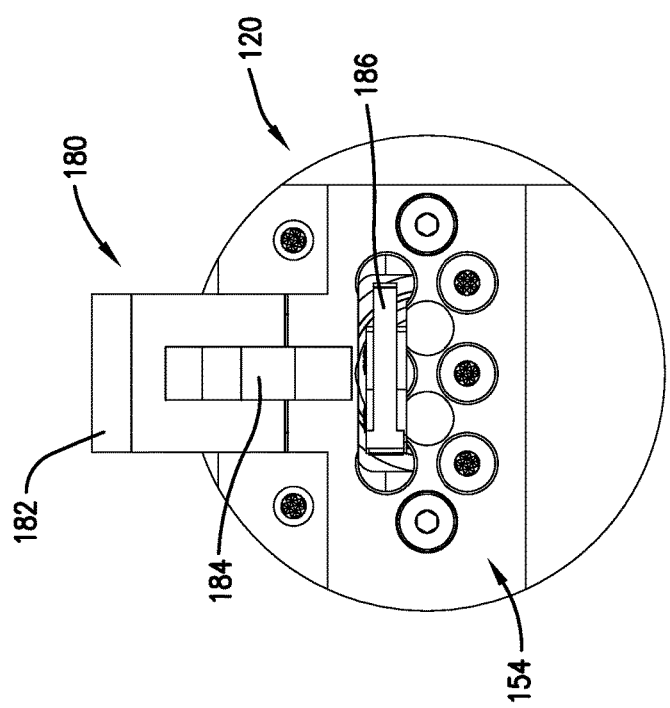
Figure 8:
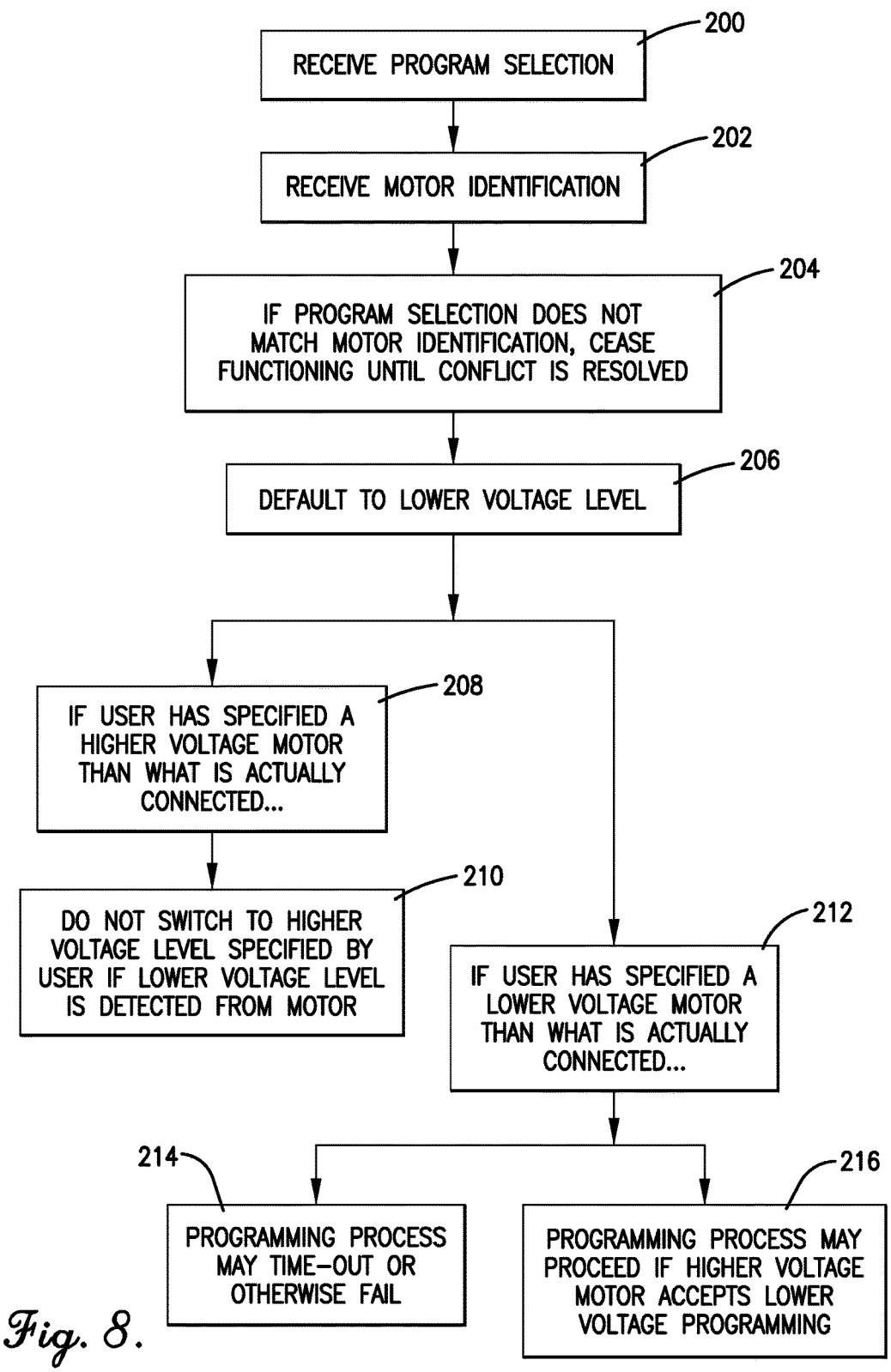

FIG. 4 an isometric view of the handset component of FIG. 3 operationally engaged with the electrical connection block component of FIG. 2;

FIG. 5 is a fragmentary cross-sectional view of the handset component of FIG. 3;

FIG. 6 is an isometric view of an embodiment of the motor programming tool of the present invention having a levered mechanical hook;

FIG. 7 is a front elevation view of the motor programming tool of FIG. 6 showing a microswitch component; and FIG. 8 is a flowchart of steps performed by a software component of the motor programming tool.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Referring to FIG. 1, an embodiment of a motor programming tool 20 is shown constructed in accordance with the present invention and configured to facilitate programming an electric motor 22 having a housing 24 and an electrical connection block 26. The example motor 22 and its components described herein and shown in the figures are only for descriptive purposes, and the present invention is not limited to any specific motor design, feature, or functionality. Referring also to FIG. 2, the example electrical connection block 26 may be located within, partially within, and/or on the housing 24, and may include one or more motor terminals 28 electrically connected to internal motor circuitry and electronics. In particular, the internal motor circuitry and electronics may include a programmable controller 30 located within the housing 24. The programmable controller 30 may be configured to control various operational characteristics (e.g., speed) of the motor 22.

An embodiment of the motor programming tool 20 may be configured to facilitate programming the programmable controller 30 of the motor 22 by temporarily engaging or otherwise associating with the electrical connection block 26 and communicating programming signals to the programmable controller. Embodiments of the programming tool 20 may be configured for use with low voltages (e.g., approximately less than 50 V), high voltages (e.g., approximately equal to or greater than 50 V), or both low and high voltages (dual voltage compatibility by, e.g., detecting and using the particular voltage which is appropriate for a particular motor, as described below). For example, the programming tool 20 may be configured to program tap settings and/or other aspects of motors such as Nidec Motor Corporation's 460 V SelecTech motors and 230/460 V EcoApex 56 motors, and other electronically commutated (ECM) motors that require relatively low or high voltages (e.g., less than 50, 120, 230, 370, 460, or more volts) power and programming signals to establish communication with the programmable controller 30. For example, the internal motor circuitry and electronics of the 460 V SelecTech motor may include a first stage having a "buck" electronic power factor correction (PFC) circuit which converts 460 VAC line voltage to a 325 VDC bus, and a second stage motor inverter circuit which is powered by the 325 VDC bus. The electronic PFC circuit requires at least 265 VAC for reliable operation of the auxiliary power supply to power the programmable controller 30, so, for this particular type of motor, the programming tool 20 may be required to provide at least 265 VAC to program the motor 22.

Referring also to FIG. 3, an embodiment of the programming tool 20 may broadly comprise a handset 36, a base unit 38, and software running on the handset 36, the base unit 38, or a separate computing device 40. These components may be in wired and/or wireless communication with each other. In one implementation, the handset 36 may be connectable at a first end 44 to the base unit 38 and at a second end 46 to the electrical connection block 26 of the motor 22, and may include a tool body 48 and internal electrical wiring 50. The first end 44 of the handset 36 may employ a strain relief mechanism to better accommodate and maintain a wired connection with the base unit 38. The base unit 38 may be further connectable to the computing device 40, and may include a transformer 52.

Referring also to FIGS. 4 and 5, the tool body 48 may include an interface portion 54 configured to selectively engage or otherwise associate with the electrical connection block 26 of the motor 22 (as illustrated in FIG. 4). The internal electrical wiring 50 may be configured to carry low and/or high voltage programming signals, and may include a plurality of tool terminals 56 at the interface portion 54 for selective electrical contact with the plurality of motor terminals 28 at the electrical connection block 26 to facilitate communication of the programming signals between the programming tool 20 and the programmable controller 30 of the motor 22.

One or more of the tool terminals 56 may be gendered terminals configured to engage correspondingly gendered motor terminals 28 and maintain engagement by a friction force. One or more of the tool terminals 56 may be spring-loaded tool terminals (sometimes referred to as "pogos") configured to engage corresponding motor terminals 28 and maintain engagement by a restorative force. In various implementation, the tool terminals 56 may be all gendered terminals, all spring-loaded terminals, or any combination thereof. For example, in one implementation, the number of gendered tool terminals may be determined by a minimum total amount of the individual friction forces required to securely maintain the interface portion 54 engaged with the electrical connection block 26, thereby minimizing the amount force needed to connect and disconnect the programming tool 20, which reduces the potential for damage to the terminals and/or other components. For example, in one implementation there may be a minimum of four (4) such friction-fit gendered tool terminals.

Additionally or alternatively, referring to FIGS. 6 and 7, an embodiment of the programming tool 120 may include a mechanical connection 180, such as a levered mechanical hook, configured to securely maintain the interface portion 154 engaged with the electrical connection block 26. For example, if the mechanical connection takes the form of a levered mechanical hook, the hook 180 may include a lever portion 182 and an engagement portion 184. The hook 180 may be spring-loaded or otherwise normally biased toward a closed position in which the engagement portion 184 is physically engaged with a recess or other complimentary structure on the housing 24 or the electrical connection block 26. The lever portion 182 may be selectively depressible or otherwise actuatable to move the hook 180 into an open position in which the engagement portion 184 is unengaged from the complimentary structure. The levered mechanical hook 180 may be used in combination with or in place of the gendered motor terminals 28 to maintain engagement of the interface portion 154 with the electrical connection block 26.

The plurality of tool terminals 56 may include first and second electrical ground tool terminals 58,60. The first electrical ground tool terminal 58 may be longer than the other tool terminals 56 so as to be the first electrical contact established when the interface portion 54 is selectively engaged with the electrical connection block 26 and the last electrical contact broken when the interface portion 54 is selectively disengaged from the connection block 26 (i.e., a first-to-make, last-to-break type connection). The second electrical ground tool terminal 60 may be configured to make electrical contact with the housing 24 of the motor 22 when the interface 54 is selectively engaged with the electrical connection block 26, thereby providing redundant electrical grounding. The first and second electrical ground tool terminals 58,60 may be electrically connected within the tool body 48. In various implementations, one or both of the first and second electrical ground tool terminals 58,60 may be implemented as pogos.

One or more of the plurality of tool terminals 56 may be disposed within electrically non-conductive (e.g., plastic) recesses configured to shield the high voltage terminals from accidental contact and also to maintain both a sufficient creepage distance and a sufficient clearance distance for the tool terminals 56. As used herein, sufficient creepage and clearance distances may be the minimum distances necessary to prevent arcing between adjacent terminals 56, and may vary depending on such factors as the voltage and materials used.

The interface portion 54 may further include a mechanical key or other structure 64 configured to allow the interface portion 54 to engage the electrical connection block 26 of a first type or types of motor and to prevent the interface portion 54 from engaging the connection block 26 of a second type or types of motor. Alternatively, the mechanical key or other structure 64 may be eliminated to allow the interface portion 54 to engage the connection blocks of any of a number of different types of motors.

The programming tool 20 may further include first and second interlocks 66,68 configured to control the presence of voltage, especially high voltage power, at the interface portion 54. The first and second interlocks 66,68 may be redundant and it may be necessary to simultaneously satisfy both interlocks 66,68 before voltage is allowed and the programming process can commence. In one implementation, the first interlock 66 may be achieved in the software running on the computing device 40, and the second interlock 68 may be mechanical or electrical in nature. In particular, the software interlock 66 may be configured to allow provision of high voltage power only during programming of the programmable controller 30 by automatically allowing power to be provided or otherwise applied at the beginning of a programming process and automatically disallowing power from being provided or otherwise removed at the end of the programming process. Thus, for example, the software interlock 66 may require that the computing device 40 be actively programming the motor 22 for high voltage power to be present at the interface portion 54.

The second interlock 68 may be configured to allow provision of high voltage power only when one or more of the tool terminals 56 are in electrical contact with one or more of the motor terminals 28. The second interlock 68 may require that the handset 36 must be physically plugged into the electrical connection block 26 in order to satisfy the interlock loop. As such, the second interlock 68 may be implemented as or with one or more of the tool terminals 56, such as the second electrical ground tool terminal 60, which is mechanically affected by physical engagement with the electrical connection block 26.

Referring again to FIG. 7, in another implementation the first interlock may be achieved with a microswitch 186, and the second interlock may be the mechanical or electrical interlock. In particular, the microswitch interlock 186 may be configured to allow provision of high voltage power only when the interface portion 154 is properly engaged with the electrical connection block 26. The microswitch 186 may be biased normally open, and the electrical connection block 26 may include a pin or other structure (not shown) which presses or otherwise closes the microswitch 186 when the interface portion 154 is properly and fully engaged with the electrical connection block 26.

The programming tool 20 may further include a time delay feature in which a time delay is inserted between satisfaction of both the first and second interlocks 66,68 and application of high voltage. This allows additional time for line voltage terminals of the programming tool 20 to fully engage their respective motor terminals before the line voltage is applied, thereby minimizing arcing and pitting and extending the life of the terminals. The time delay feature may be implemented using an RC filter between the output of the "relay close" signal and the actual relay coil driver to provide, for example, approximately one second of delay.

The tool body 48 may further include a visual indicator mechanism 72 configured to visually indicate the presence of high voltage power at the interface portion 54. In one implementation, the visual indicator 72 may include one or more light sources (e.g., LEDs) configured to emit light when the power is present, and a light ring 74 disposed around the tool body 48 and configured to disperse the light emitted by the one or more light sources around the tool body 48 so as to be visible by a user of the programming tool 20 from multiple directions. In more detail, the visual indicator 72 may include a semi-transparent or transparent ring of light dispersing material 74 (e.g., acrylic) and first and second LEDs spaced approximately one-hundred eighty (180) degrees apart around the tool body 48 and configured to introduce light to the ring of light dispersing material 74 when high voltage is present.

Referring also to FIG. 8, the programming tool 20 may further include a motor identification feature 76 at least partially implemented in the software running on the computing device 40, and configured to determine a type of motor to which the programming tool 20 is engaged, and further configured to accommodate the voltage requirement, whether low or high (e.g., 120, 230, 460 V), of the determined type of motor. In one implementation this process may proceed substantially as follows. A user of the programming tool 20 may select a program for programming the motor, as shown in 200. The user may then provide an identification of the motor or type of motor to be programmed, as shown in 202. This may involve the user scanning an identification (e.g., a barcode or similar identifying symbol) on the motor. If the scanned identification (of, e.g., a 230 or 460 V motor) does not match the selected program (for, e.g., a 460 or 230 V motor, respectively), then the programming tool 20 may not function until the conflict is resolved, as shown in 204. The programming tool 20 may initially default to a lower voltage level (e.g., 230 V), as shown in 206, even if the user initially identifies a motor requiring a higher voltage level (e.g., 460 V). If the user has incorrectly identified the motor as requiring a higher voltage level when, in fact, the lower voltage level is appropriate as shown in 208, then the programming tool 20 may make that determination (e.g., it may receive signals from the motor at the lower voltage level) and may not switch to the higher voltage level, as shown in 210. If the user has incorrectly identified the motor as requiring a lower voltage level, when, in fact, the higher voltage level is appropriate, as shown in 212, then two outcomes may be possible, neither of which may be damaging or dangerous. The motor may fail to power-up because the voltage is too low, and the programming tool 20 may eventually time-out due to a lack of communication, as shown in 214. Alternatively, some higher voltage motors may power-up at the lower voltage level due to tolerances in motor power supplies, and if this happens then the programming tool 20 may proceed with programming the motor, as shown in 216.

Further, if the user selects a program for a higher voltage motor, scans the identification for a higher voltage motor, and then connects a lower voltage motor to program, then one or more fuses in the programming tool 20 may open, thereby protecting the programming tool 20, and possibly the motor, from damage. In one implementation, the programming tool 20 may include a first fuse for the output power from the handset 36, and a second fuse for the input power to the base unit 38.

The transformer 52 of the base unit 38 may be an energy-limited transformer having an electrically isolated high impedance secondary winding and otherwise configured both to provide an electrical isolation to protect against an electrical shock to a user of the programming tool 20 and to provide a low energy output to protect against an arc flash damage to the motor 22. In one embodiment, the transformer 52 may have a secondary winding output of 360 V, and may not be a typical 1:1 turns ratio isolation transformer or a typical 24 V output isolation transformer, but rather may be specifically designed to power vacuum tubes. In a vacuum tube application, the 5 V output may be for the filament circuit, and the 360 V output may be for the plate circuit of the vacuum tube amplifier. The transformer 52 may provide appropriately isolated primary and secondary windings, and may be rated for an approximately 2000 V high potential. In particular, the secondary winding may be isolated from the earth-ground connection so that electrical shock may not occur unless contact is made with both of the output pins simultaneously. The transformer 52 may provide limited energy output to reduce the potential for "arc flash" and minimize low level arcing and sparking due to fault conditions. Limited energy output may be achieved with a high resistance (i.e., small wire diameter) secondary winding. Further, the transformer 52 may provide an additional tap on the secondary winding, which may be used in implementing the multi-voltage switching feature discussed above. Suitable transformers may include, for example, Hammond Manufacturing's "classic" filament and plate power transformers.

Thus, embodiments of the programming tool 20 may provide significant advantages over prior art tools. For example, the programming tool 20 may incorporate the software interlock feature 66 configured to substantially automatically apply voltage at the beginning of the programming process and remove it at the end of the process. The programming tool 20 may incorporate the motor identification feature 74 configured to substantially automatically determine the type of motor to which the tool 20 is connected and then accommodate the voltage requirements of that motor. The programming tool 20 may incorporate the more visible visual indicator 72 that high voltage is present at the interface portion 54, such as the partially or fully encircling light ring which is lit when high voltage is present. The programming tool 20 may employ the energy-limited transformer 52 having an electrically isolated high impedance secondary winding and otherwise configured both to provide an electrical isolation to protect against an electrical shock to a user of the programming tool 20 and to provide a low energy output to protect against an arc flash damage to the motor 22. Any one or more of these advantages may be found in particular embodiments of the present invention.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A tool for programming a programmable controller of an electric motor by temporarily associating with a connection block of the electric motor and providing high voltage power and communicating programming signals to the programmable controller, the tool comprising:
   a tool body including an interface portion configured to selectively engage the connection block of the electric motor;
   wiring configured to carry the high voltage power and the programming signals, and presenting a plurality of tool terminals at the interface portion for selective electrical contact with a plurality of motor terminals at the connection block to facilitate providing the high voltage power and communicating the programming signals to the programmable controller; and
   a microswitch interlock configured to be closed by engagement of the interface portion of the tool body with the connection block of the electric motor, and to allow provision of the high voltage power only when closed.

2. The tool as set forth in claim 1, the plurality of tool terminals at the interface portion including—
   a first electrical ground tool terminal which is longer than the other tool terminals so as to be the first electrical contact established when the interface portion is selectively engaged with the connection block, and the last electrical contact broken when the interface portion is selectively disengaged from the connection block; and
   a second electrical ground tool terminal which makes electrical contact with a housing of the motor when the interface portion is selectively engaged with the connection block,
   wherein the first and second electrical ground tool terminals are electrically connected within the tool body.

3. The tool as set forth in claim 1, wherein one or more of the plurality of tool terminals are disposed within a plurality of electrically non-conductive recesses configured to maintain both a sufficient creepage distance and a sufficient clearance distance between an adjacent pair of the plurality of tool terminals.

4. The tool as set forth in claim 1, wherein one or more of the plurality of tool terminals is a spring-loaded tool terminal configured to engage a corresponding one or more of the plurality of motor terminals and maintain engagement by a restorative force.

5. The tool as set forth in claim 4, wherein one or more of the plurality of tool terminals is a gendered tool terminal configured to engage a correspondingly gendered one or more of the plurality of motor terminals and maintain engagement by a friction force, and wherein the number of gendered tool terminals is determined by a minimum total amount of the individual friction forces required to maintain the interface portion engaged with the connection block.

6. The tool as set forth in claim 1, further including a software interlock configured to allow provision of the high voltage power only during programming of the programmable controller by automatically allowing the high voltage power to be provided at the beginning of a programming process and automatically disallowing the high voltage power from being provided at the end of the programming process.

7. The tool as set forth in claim 1, further including an electrical interlock configured to allow provision of the high voltage power only when one or more of the plurality of tool terminals is in electrical contact with one or more of the plurality of motor terminals.

8. The tool as set forth in claim 1, further including a visual indicator mechanism configured to visually indicate a presence of the high voltage power at the interface portion, the visual indicator including one or more light sources configured to emit light when the high voltage power is present.

9. The tool as set forth in claim 8, wherein the visual indicator mechanism includes a light ring disposed around the tool body and configured to disperse the light emitted by the one or more light sources around the tool body so as to be visible by a user of the tool from multiple directions, and wherein the one or more light sources are first and second light emitting diodes spaced approximately 180 degrees apart around the tool body, and the light ring fully encircles the tool body.

10. The tool as set forth in claim 1, the tool further including—
  a microprocessor executing a software component configured to determine a type of the electric motor to which the tool is engaged, and configured to accommodate a particular voltage requirement of the determined type of the electric motor; and
  an energy-limited transformer configured to provide an electrical isolation to protect against an electrical shock to a user of the tool, and configured to provide a low energy output to protect against an arc flash damage to the electric motor.

11. A tool for programming a programmable controller of an electric motor by temporarily associating with a connection block of the electric motor and providing high voltage power and communicating programming signals to the programmable controller, the tool comprising:
  a tool body including an interface portion configured to selectively engage the connection block of the electric motor;
  wiring configured to carry the programming signals, and presenting a plurality of tool terminals at the interface portion for selective electrical contact with a plurality of motor terminals at the connection block to facilitate communication of the programming signals between the tool and the programmable controller;
  a mechanical connection configured to selectively maintain the interface portion engaged with the connection block, wherein the mechanical connection is normally biased toward a closed position in which the mechanical connection is physically engaged with a complimentary structure on the electrical connection block; and
  a microswitch interlock configured to be closed by engagement of the interface portion of the tool body with the connection block of the electric motor, and to allow provision of the high voltage power only when closed.

12. The tool as set forth in claim 11, the plurality of tool terminals at the interface portion including—
  a first electrical ground tool terminal which is longer than the other tool terminals so as to be the first electrical contact established when the interface portion is selectively engaged with the connection block, and the last electrical contact broken when the interface portion is selectively disengaged from the connection block; and
  a second electrical ground tool terminal which makes electrical contact with a housing of the motor when the interface portion is selectively engaged with the connection block,
  wherein the first and second electrical ground tool terminals are electrically connected within the tool body.

13. The tool as set forth in claim 11, wherein one or more of the plurality of tool terminals are disposed within a plurality of electrically non-conductive recesses configured to maintain both a sufficient creepage distance and a sufficient clearance distance between an adjacent pair of the plurality of tool terminals.

14. The tool as set forth in claim 11, further including a software interlock configured to allow provision of the high voltage power only during programming of the programmable controller by automatically allowing the high voltage power to be provided at the beginning of a programming process and automatically disallowing the high voltage power from being provided at the end of the programming process.

15. The tool as set forth in claim 11, further including an electrical interlock configured to allow provision of the high voltage power only when one or more of the plurality of tool terminals is in electrical contact with one or more of the plurality of motor terminals.

16. The tool as set forth in claim 11, wherein one or more of the plurality of tool terminals is a spring-loaded tool terminal configured to engage a corresponding one or more of the plurality of motor terminals and maintain engagement by a restorative force.

17. The tool as set forth in claim 16, wherein one or more of the plurality of tool terminals is a gendered tool terminal configured to engage a correspondingly gendered one or more of the plurality of motor terminals and maintain engagement by a friction force, and wherein the number of gendered tool terminals is determined by a minimum total amount of the individual friction forces required to maintain the interface portion engaged with the connection block.

18. The tool as set forth in claim 11, further including a visual indicator mechanism configured to visually indicate a presence of the high voltage power at the interface portion, the visual indicator including one or more light sources configured to emit light when the high voltage power is present.

19. The tool as set forth in claim 18, wherein the visual indicator mechanism includes a light ring disposed around the tool body and configured to disperse the light emitted by the one or more light sources around the tool body so as to be visible by a user of the tool from multiple directions, and wherein the one or more light sources are first and second light emitting diodes spaced approximately 180 degrees apart around the tool body, and the light ring fully encircles the tool body.

20. A tool for programming a programmable controller of an electric motor by temporarily associating with a connection block of the electric motor and providing high voltage power and communicating programming signals to the programmable controller, the tool comprising:
  a tool body including an interface portion configured to selectively engage the connection block of the electric motor;
  wiring configured to carry the high voltage power and the programming signals, and presenting a plurality of tool terminals at the interface portion for selective electrical contact with a plurality of motor terminals at the connection block to facilitate providing the high voltage power and communicating the programming signals to the programmable controller;
  a mechanical connection configured to selectively maintain the interface portion engaged with the connection block, wherein the mechanical connection is normally biased toward a closed position in which the mechanical connection is physically engaged with a complimentary structure on the electrical connection block;
  a microswitch interlock configured allow provision of the high voltage power only when closed by engagement of the interface portion of the tool body with the connection block of the electric motor, and to;

a software interlock configured to allow provision of the high voltage power only during programming of the programmable controller by automatically allowing the high voltage power to be provided at the beginning of a programming process and automatically disallowing the high voltage power from being provided at the end of the programming process; and a visual indicator mechanism including a light source configured to emit light when the high voltage power is being provided to the programmable controller.

* * * * *